2,831,864
Patented Apr. 22, 1958

2,831,864

1-P-ALKOXYPHENYL-1-ALKYL-3-PIPERIDINO-1-PROPENES

Earl R. Bockstahler, Indianapolis, Ind., assignor to Allied Laboratories, Inc., Kansas City, Mo., a corporation of Delaware No Drawing. Application February 13, 1957
Serial No. 639,845

6 Claims. (Cl. 260—294.7)

The present invention relates to 1-p-alkoxyphenyl-1-alkyl-3-piperidino-1-propenes and a method for their production. These novel compounds are represented by the following formula:

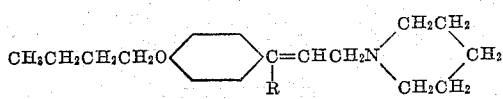

in which R represents H, or an alkyl group having not more than six carbon atoms.

My novel compounds in the form of the base are characterized in that they are viscous liquid substances and that they form salts with acids which are for the most part white crystalline substances. The bases are soluble in many organic solvents and have a low solubility in water. The acid salts are soluble in water and have a low solubility in most organic solvents.

The new compounds of this invention are valuable and adapted to be employed as active toxic constituents of disinfectant and bactericidal compositions for the control of many common bacterial and fungal organisms.

My new compounds wherein R is an alkyl group as defined above may be prepared by treating beta-piperidino-para-n-butoxy-propiophenone with an appropriate alkyl Grignard agent in dry ether. When this mixture is refluxed water apparently splits out to give the appropriate propenes. When the reaction was planned it was expected that a carbinol would be obtained, so it was quite surprising to find that the propenes were obtained instead thereof and in excellent yields. It is possible, of course, that a carbinol is first formed in the reaction but readily splits out water to give the unsaturated propenes.

More detailed methods of preparing my novel compounds are set forth in the following examples which are given by way of illustration:

EXAMPLE I

*1-piperidino-3-p-n-butoxyphenylheptene-2 hydrochloride*

A solution of 13.3 g. of β-piperidino-p-n-butoxypropiophenone in 100 ml. of petroleum ether was added slowly to a stirred Grignard solution prepared from 15.8 g. of n-butyl bromide, 2.8 g. of magnesium and 150 ml. of dry ethyl ether. The mixture was refluxed for an hour, then left at room temperature over night. It was then poured with stirring over a mixture of ice and a slight excess of hydrochloric acid. The white solid which formed was collected by filtration and shaken with a mixture of petroleum ether and excess aqueous sodium hydroxide. The petroleum ether layer was separated and stirred with a slight excess of concentrated hydrochloric acid. The solid obtained was filtered off and recrystallized several times from water. In recrystallizing, it was necessary to collect separately those crystals which formed promptly and those which formed slowly on standing. The latter were discarded. The former, which melted at 222.5–223° C. when pure, proved upon analysis to be 1-piperidino-3-p-n-butoxyphenylheptene-2 hydrochloride.

EXAMPLE II

*1-piperidino-3-p-n-butoxyphenylpentene-2 hydrochloride*

A solution of 14.5 g. of β-piperidino-p-n-butoxypropiophenone in 50 ml. of petroleum ether was added slowly to a stirred Grignard solution prepared from 19.5 g. of ethyl iodide, 3.1 g. of magnesium, and 50 ml. of dry ether. The mixture was refluxed one and a half hours, and left at room temperature over night. It was then cooled in an ice bath while 40 ml. of 20% aqueous hydrochloric acid was stirred in slowly. The solid which precipitated was filtered off, then suspended in excess aqueous sodium hydroxide and extracted with ether. The dried ether extract was stirred with a slight excess of concentrated hydrochloric acid. The solid which resulted was filtered off and recrystallized from water. The product thus obtained had a melting point of 192–193°, and was 1-piperidino-3-p-n-butoxyphenylpentene-2 hydrochloride.

EXAMPLE III

*3-piperidino-1-(p-n-butoxyphenyl)propene-1 hydrochloride*

A solution of 14.5 g. of β-piperidino-p-n-butoxypropiophenone in 200 ml. of ether was added during one hour to a stirred suspension of 2.1 g. of lithium aluminum hydride in 200 ml. of dry ether. The mixture was then stirred and refluxed for five hours, after which it was cooled in an ice bath while 170 cc. of 10% aqueous sodium hydroxide was stirred in cautiously. The water layer was then discarded. The ether layer was extracted several times with dilute aqueous hydrochloric acid. The acid extract was made alkaline with potassium carbonate, and extracted several times with ether, which was then dried over potassium carbonate. Hydrochloric acid gas was passed into the dried ether solution in slight excess, and the solid which precipitated was recrystallized from ethyl acetate. The pure product had a melting point of 226–228° and was 3-piperidino-1-(p-n-butoxyphenyl)propene-1 hydrochloride.

This substance was also obtained by catalytic hydrogenation. A mixture of 10 g. of β-piperidino-p-n-butoxypropiophenone hydrochloride, 0.5 g. of 5% palladized charcoal, and 200 ml. of water was shaken with hydrogen under 20 lbs. pressure until no further absorption of hydrogen occurred. The solution was filtered and evaporated to dryness under reduced pressure, and the solid residue was recrystallized from methyl ethyl ketone.

In the foregoing examples the desired base is conveniently freed from the reaction impurities by conversion to and recovery of the crystalline hydrochloride. The hydrochloric acid addition compounds may be converted to the substantially pure free base by treatment with appropriate acids, such as; phosphoric, sulphuric, citric and the like.

My compounds are effective as bactericides and fungicides for the control of many microorganisms. These desirable properties are illustrated in the following:

In a representative operation the antimicrobial activity of 1- 1 piperidino - 3 - p - n - butoxyphenylpentene - 2 hydrochloride, 1 - piperidino - 3 - p - n - butoxyphenylheptene-2 hydrochloride, and 3-piperidino-1-(p-n-butoxyphenyl)propene-1 hydrochloride was determined by means of the serial twofold broth dilution technic against the following microorganisms: *Staphylococcus aureus, Escherichia coli, Trichophyton mentagrophytes, Trichophyton purpureum, Microsporum audouini, Microsporum lanosum,* and *Candida albicans.* Brain heart infusion broth was used for the bacterial tests, and Sabouraud maltose broth for the molds and yeast. Lethal concentrations of drug were determined for each organism in plain medium and in medium containing 10% normal horse serum. Activity of the compounds was compared with that of a group of known antimicrobial agents consisting of benzoic acid, undecylenic acid, and G–4 (bis(2-hydroxy-5-chlorophenyl) methane).

The bactericidal concentration of 1-piperidino-3-p-n-butoxyphenylpentene-2 hydrochloride for the Staphylococcus and *Escherichia coli* in plan broth was 8.0 mg. percent in each case. For 1-piperidino-3-p-n-butoxyphenylheptene-2 hydrochloride, 2.0 mg. percent was required to kill the Staphylococcus and 4.0 mg. percent necessary for *Escherichia coli*. In comparison, the minimum bactericidal concentration of G–4 for the Staphylococcus was 0.5 mg. percent, and 1.0 mg. percent for *Escherichia coli*. 3-piperidino-1-(p-n-butoxyphenyl)-propene-1 hydrochloride was not tested for antibacterial activity.

The antifungal activity of the three ketones compared favorably with that of the known agents, and in a number of instances appeared greater, especially in the presence of serum. For example, the minimum lethal concentrations of 1-piperidino-1-(p-n-butoxyphenyl)propene-1 hydrochloride for *Trichophyton purpureum* in serum-broth were 12.5 mg. percent and 25 mg. percent, respectively, while corresponding endpoints were greater than 25 mg. percent for undecylenic acid, and greater than 50 mg. percent for benzoic acid. In general, antifungal activity of the ketones appeared to be enhanced in the presence of serum.

I claim:

1. A compound of the group consisting of those represented by the following general formula:

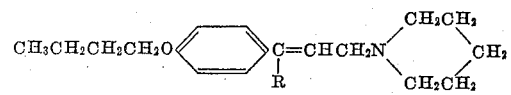

and their salts with acids where R is a member selected from the group consisting of hydrogen and alkyl groups having not more than six carbon atoms.

2. 1 - piperidino - 3 - p - n - butoxyphenylheptene - 2 hydrochloride.

3. 1 - piperidino - 3 - p - n - butoxyphenylpentene - 2 hydrochloride.

4. 3 - piperidino - 1 -(p - n - butoxyphenyl)propene - 1 hydrochloride.

5. 1-piperidino-3-p-n-butoxyphenylheptene-2.

6. 1-piperidino-3-p-n-butoxyphenylpentene-2.

No references cited.